United States Patent [19]  
Sundberg

[11] 4,037,512
[45] July 26, 1977

[54] WIRE NAIL
[75] Inventor: B. E. Ingvar Sundberg, Tyreso, Sweden
[73] Assignee: Nordisk Kartro Aktiebolag, Sweden
[21] Appl. No.: 517,621
[22] Filed: Oct. 24, 1974
[30] Foreign Application Priority Data
  Oct. 24, 1973  Sweden .............................. 7314419
  Oct. 24, 1973  Sweden .............................. 7314420
[51] Int. Cl.² ............................................. F16B 13/04
[52] U.S. Cl. ...................................... 85/79; 85/23
[58] Field of Search ............... 85/23, 31, 26, 72, 79, 85/67, 69

[56] References Cited
U.S. PATENT DOCUMENTS

| | | | |
|---|---|---|---|
| 314,862 | 3/1885 | McMurtry | 85/31 X |
| 340,082 | 4/1886 | Barrows | 85/31 X |
| 1,024,776 | 4/1912 | Hanson | 85/23 |
| 1,480,617 | 1/1924 | Hojnowski | 85/26 |
| 1,798,273 | 3/1931 | Pleister | 85/79 X |
| 1,805,553 | 5/1931 | Pope | 85/31 X |
| 2,362,969 | 11/1944 | Boelter | 85/79 |
| 2,474,281 | 6/1949 | Ruiz | 85/26 |
| 3,518,915 | 7/1970 | Gutshall | 85/79 X |
| 3,765,295 | 10/1973 | Ptak | 85/72 |
| 3,894,469 | 7/1975 | Nilsson | 85/79 |

FOREIGN PATENT DOCUMENTS

| | | | |
|---|---|---|---|
| 127,529 | 5/1948 | Australia | 85/72 |
| 1,304,001 | 4/1962 | France | 85/79 |
| 471,134 | 1/1929 | Germany | 85/21 |
| 68,340 | 10/1944 | Norway | 85/23 |
| 418,089 | 10/1934 | United Kingdom | 85/31 |

Primary Examiner—Roy D. Frazier
Assistant Examiner—Thomas J. Holko
Attorney, Agent, or Firm—Hill, Gross, Simpson, Van Santen, Steadman, Chiara & Simpson

[57] ABSTRACT

An expanding wire nail for fastening baseboards and the like to concrete walls has two aligned shank segments integrally joined by a ligament of cruciform cross-section forming a weakened zone between oblique wedge faces on the adjacent ends of the shank segments. The ligament and the wedge faces are formed by plastic deformation of the shank from opposite sides in a forming die assembly. The forming die assembly has opposed forming punches driven in phase opposition, each forming punch being driven in unison with one of two aligned tip cutting punches.

5 Claims, 8 Drawing Figures

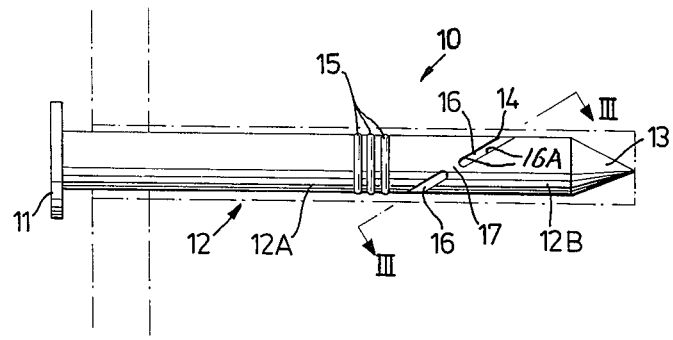
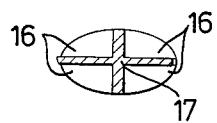 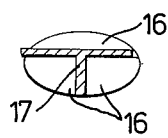 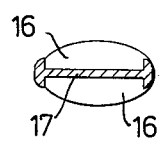
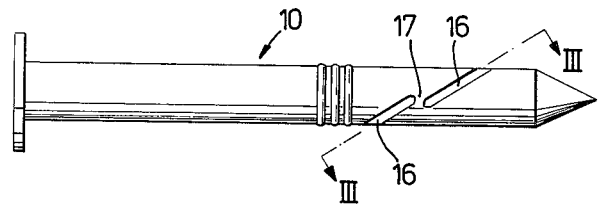

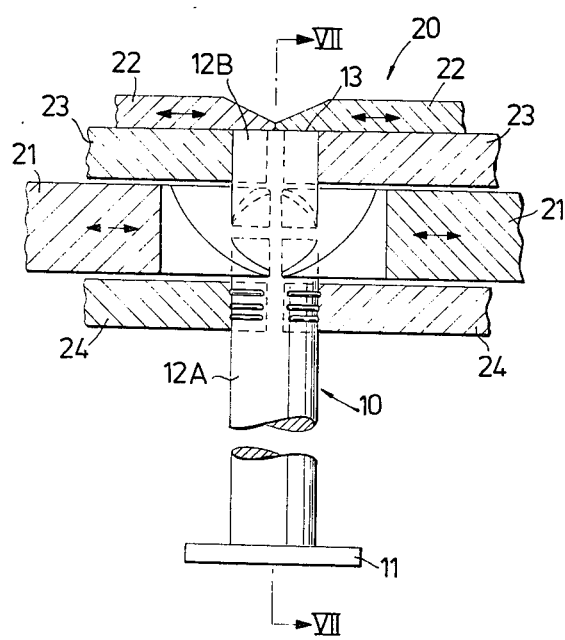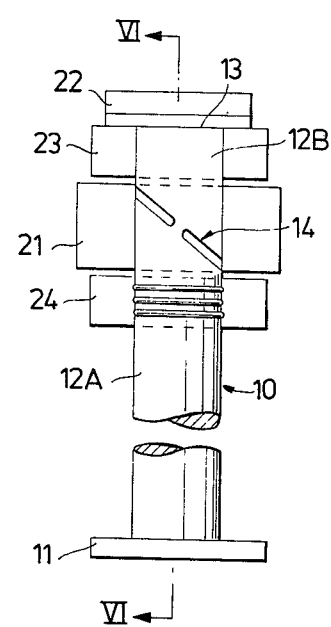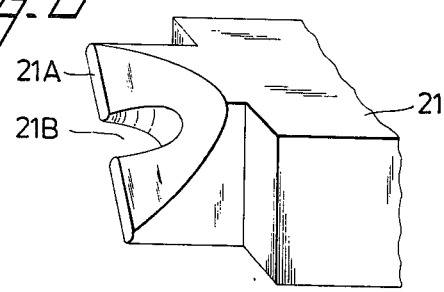

WIRE NAIL

BACKGROUND OF THE INVENTION

Field of the Invention

This invention relates to nails of the type comprising a straight, headed shank having between the ends thereof a weakened zone of reduced cross-sectional surface area and oblique end faces on opposite sides of the weakened zone.

PRIOR ART

A known nail used e.g. for nailing baseboards to concrete walls is shown in Nilsson Pat. No. 3,894,469 and is assigned to the same assignee. That nail has a straight headed shank between the ends of which there is provided a weakened zone which is defined by two aligned oblique slot-like notches and which divides the shank into two segments held together by an intervening ligament at the inner ends of the notches. In use, the nail is passed through a bore in the baseboard or like to be nailed and inserted in a previously bored blind hole in the concrete wall. The depth of the blind hole is chosen such that the tip of the shank engages the bottom of the hole before the head of the nail engages the baseboard. The headed nail shank segment protruding from the baseboard is then driven further by a hammer or other impact tool so that the ligament is distorted and possibily ruptured and the headed shank segment is displaced axially inwardly in the hole while the tip segment is prevented from axial movement inwardly. The adjacent oblique and approximately parallel end faces of the shank segments then slide on each other to displace the adjacent ends of the segments laterally and wedge them firmly against the walls of the hold.

By means of nails of the afore-mentioned type the fastening of elements of various kinds on concrete or other hard structures can often be accomplished in a relatively simple manner. However, the oblique slots not only form the desired weakened zone or localized spot of rupture but also reduce the ability of the nails to withstand bending forces, so that the nails are often inadvertently bent during the handling. Moreover, the slots render the nails expensive; the slots are formed in a separate operation and a substantial portion of the total cost is therefore due to the slots.

SUMMARY OF THE INVENTION

In accordance with the present invention there is provided a nail of the afore-mentioned kind having substantially greater resistance to bending in the weakened zone, that is, the ligament interconnecting the two shank segments, than the known nails of this kind. The nail according to the invention is primarily characterized in that the cross-section of the weakened zone, throughout the extent thereof in the longitudinal direction of the nail, extends to a point substantially flush with the circumferential surface of the shank segments at least at three, and preferably at four, locations which are at least approximately uniformly spaced circumferentially. This construction is based on the concepts of the ligaments or weakened zone's having a small cross-sectional surface area in a plane parallel to the oblique end faces so as to easily deform or rupture under the influence of the shearing stress imposed on it during the driving of the headed shank segment, and of the distribution of this surface area being such as to provide a great moment of inertia of the ligament about the axis of the shank. These concepts may advantageously be embodied in ligaments of cruciform or T shape, for example.

The invention will be more fully understood from the following description, taken in connection with the accompanying drawings.

ON THE DRAWINGS

FIG. 1 is an elevational view of a nail embodying the invention;

FIG. 2 is a view similar to FIG. 1 and illustrates a modification;

FIG. 3 is a view in cross-section on line III—III of FIGS. 1 and 2;

FIGS. 4 and 5 are cross-sectional views corresponding to FIG. 3 and show modified cross-sectional shapes.

FIG. 6 is a diagrammatic view, partly in section on line VI—VI of FIG. 7, of a device for use in making the nail shown in FIG. 1;

FIG. 7 is a view on line VII—VII of FIG. 6;

FIG. 8 is a fractional view in perspective of an end portion of a forming punch of the device shown in FIGS. 6 and 7.

AS SHOWN ON THE DRAWINGS:

As shown in FIGS. 1 and 2, the wire nail 10 has a head 11 and a straight shank 12 of circular cross-section having a flat tip 13. Adjacent the tip 13 there is provided a weakened zone 14 and adjacent this zone, on the side thereof remote from the tip, there are provided a number of protrusions formed by transverse ridges or flanges 15. The weakened zone 14 includes four similar slot-like recesses 16 which are symmetrically positioned about the longitudinal axis of the shank 12 in the cross-sectional plane III—III and which are defined by opposed flat and parallel, oblique end faces 16A.

In the nail 10 shown in FIG. 1, the two visible recesses 16 on one side of the shank 12 are aligned, and the two recesses on the opposite side are also aligned with each other and with the two first-mentioned recesses. Thus, in FIG. 1, all the recesses 16 are situated in a common plane making an angle of approximately 30° to the longitudinal axis of the shank. In the embodiment of FIG. 2, the two visible recesses 16 on one side of the shank are parallel but slightly offset from each other in the longitudinal direction of the shank. Similarly, the two recesses on the opposite side are parallel but longitudinally offset, and moreover each of the two visible recesses 16 in FIG. 2 is coplanar with the adjacent recess on the opposite side of the shank. Thus, the cross-sectional plane III—III is comprised of two parallel but offset segments making an angle with the longitudinal axis of the shank and an intervening segment on the shank axis. In FIG. 2, the inner ends of the recesses 16 overlap slightly while in FIG. 1 the recesses terminate slightly short of the axial plane normal to the plane of the drawing.

The four recesses 16 divide the nail shank 12 into two segments, a rear or headed segment 12A and a front or tip segment 12B, held together by a web or ligament 17 defined by the inner ends of the recesses. As shown in FIG. 3, this ligament 17 when viewed in the plane III—III is a cruciform structure which is centered with respect to the longitudinal axis of the shank. From FIG. 3 it is also apparent that the cross-sectional surface area of the ligament 17 is much smaller than the total cross-sectional surface area of the shank as enclosed by the elliptical outline. Consequently, the ligament 17 is readily distorted by shearing forces and eventually ruptured upon driving the nail in a blind hole, the bottom of which engages the tip 13 of the front shank segment 12B (such a blind hole in a concrete wall and a baseboard to be fastened to the wall are indicated by phantom lines in FIG. 1). After rupturing of the ligament 17 the two shank segments slide on each other at the parallel, oblique end faces 16A defining the opposed walls of the recesses 16. On account of its cruciform cross-sectional shape, the ligament 17 has a great moment of inertia and, accordingly, great resistance to bending in all directions.

Although the cruciform shape shown in FIG. 3 is the cross-sectional shape that is ordinarily preferred, other cross-sectional shapes may be used. For example, the T and I shaped cross-sections shown in FIGS. 4 and 5 may be used. The exemplary cross-sectional shapes illustrated in FIGS. 3 to 5, as well as the shape and the location of the recesses 16 defining the weakened zone 14 shown in FIGS. 1 and 2, are only intended to illustrate the essential elements of the nail according to the invention, rather than to show all embodiments in which the inventive concept may be utilized. The cross-section of the segments of the shank need not be of circular cross-section as in the illustrated nail, but the shank may have a square cross-section, and the invention may also be embodied in nails having a fluted shank. It is essential, however, that the ligament extends to a point that is substantially flush with the circumferential surface of the nail at least at three locations which are widely spaced circumferentially so that the ligament has a great resistance to bending in all planes through the axis of the shank.

The device 20 shown in FIGS. 6 to 8 for making the nail 10 of FIG. 1 is a part of a nail-making machine which, may be conventional and of the present which is not, therefore, described in detail. Briefly, the making of the nail 10 using the device 20 comprises (I) feeding continuous wire stock of a diameter equal to the diameter of the shank of the finished nail longitudinally until its free end engages an abutment, (II) clamping the wire adjacent the free end and upsetting the free end to form the head 11, (III) forming the four recesses 16 in the shank 12 to provide the weakened zone 14 (IV) cutting the wire to form the tip 13.

The parts of the device 10 acting on the shank 12 to form the recesses and the tip comprise two aligned forming punches 21, which are displaceable by power operated means (not shown) in phase opposition perpendicularly to, and symmetrically about, a median plane containing the longitudinal axis of the shank 12 during the forming and two aligned cutting punches 22, which are movable in the same manner as, and synchronously with, the forming punches 21 and which are preferably rigidly connected with respective ones of the forming punches to move in unison therewith. In FIG. 6 the sectional line VII—VII represents the median plane, which is normal to the plane of the drawing, and the longitudinal axis of the shank and it is shown that the forming punches 21 and the cutting punches 22 work on opposite sides of the shank 12.

The mechanism holding the shank 12 during the forming of the tip 13 and the weakened zone 14 comprises two pairs of aligned clamping jaws 23 and 24 movable toward and away from an intervening clamping location adapted to receive the nail shank. The clamping jaws are displaceable by power operated means (not shown) along paths parallel to, and contained in, a plane containing the paths of movement of the forming and cutting punches. The clamping jaws, however, are operated independently, or at least partly independently, of forming and cutting punches. The clamping jaws of each pair are disposed on opposite sides of the median plane VII—VII and are effective to hold the corresponding portion of the shank 12 in the clamping location between them against displacement laterally, that is, transversely of the median plane, or longitudinally. The two pairs of clamping jaws are disposed on either side of, and immediately adjacent, the pair of forming punches 21. The semi-cylindrical gripping surfaces of the two clamping jaws 24 remote from the cutting punches 22 are provided with recesses or grooves to form the transverse ridges of flanges 15 on the rear shank segment 12A upon the clamping of this segment.

The two adjacent end portions of the forming punches 21 are mirror symmetrical about the median plane VII—VII and the end portion of the right-hand forming punch 21 is shown in FIG. 3. FIG. 3 shows that the end portion of the forming punch 21 engaging the shank to deform it has a chisel tip 21A with a central notch 21B.

The forming of the tip 13 and the weakened zone 14 of the shank 12 is accomplished as follows. After the two pairs of clamping jaws 15 have been advanced so as to hold the shank 12 with the longitudinal axis in the median plane, the two forming punches 21 and the two cutting punches 22 are advanced simultaneously from a retracted position toward the intervening forming location receiving the portion of the shank to be provided with the weakened zone until they reach the position shown in FIG. 1 so that they penetrate into the shank. The forming punches 21 are halted when their edges are spaced apart by one or a few tenths of a millimeter while the cutting punches 22 are advanced until the shank 12 is separated from the wire stock. Between the forming punches 21 there is thus left a diametral thin segment of the shank and on either side of this segment the notch 21B forms a thin, likewise diametral or radial segment so that the ligament joining the two shank segments 12A and 12B on opposite sides of the weakened zone 14 is cruciform in cross-section.

It is also possible to cut off the wire blank more or less completely transversely to form a blunt tip, simultaneously with forming the ligament portion.

What we claim is:
1. A wire nail comprising:
a. a metal shank having a solid front end adapted to be driven into a holding structure, and a solid rear end having a head;
b. said shank having at least four flat parallel wedge faces between said ends and defining at least two slots extending at an acute angle from the outside of said shank toward its axis; and
c. a web-like ligament of metal, said ligament having at least three radially outermost circumferentially spaced ends flush with the periphery of said shank, said ligament being yieldable in response to a compressive force applied to the nail ends and lying in a plane parallel to said acute angle and interconnecting said faces of said solid ends, said ligament having a continuous extent across said shank and in said plane greater than the transverse size of said shank taken perpendicularly to its length and having at least one web-like portion extending traversely to the direction of said continuous extent.

2. A wire nail according to claim 1 in which said ligament has an elongated cruciform cross-section as viewed in projection normal to said acute angle.

3. A wire nail according to claim 1 in which said ligament has a T-shaped cross-section as viewed in projection normal to said acute angle, the leg of the T-shape extending radially of said shank, and the cross-bar of the T-shape extending generally longitudinally of the shank.

4. A wire nail according to claim 1 in which said ligament has an I-shaped cross-section as viewed in projection normal to said acute angle, the transverse ends of said I-shape being spaced longitudinally along the shank from each other.

5. A wire nail according to claim 1 in which circumferential said ligament is of uniform thickness in a direction normal to the angle of said slots.

* * * * *